(12) United States Patent
Zheng et al.

(10) Patent No.: US 12,110,386 B2
(45) Date of Patent: Oct. 8, 2024

(54) RESINS FOR USE AS TIE LAYER IN MULTILAYER STRUCTURE AND MULTILAYER STRUCTURES COMPRISING THE SAME

(71) Applicant: Dow Global Technologies LLC, Midland, MI (US)

(72) Inventors: Yong Zheng, Cary, NC (US); Santosh S. Bawiskar, Sugar Land, TX (US); Brian W. Walther, Clute, TX (US); Michael B. Biscoglio, Blue Bell, PA (US); Andong Liu, Shanghai (CN)

(73) Assignee: Dow Global Technologies LLC, Midland, MI (US)

( * ) Notice: Subject to any disclaimer, the term of this patent is extended or adjusted under 35 U.S.C. 154(b) by 1026 days.

(21) Appl. No.: 17/041,640

(22) PCT Filed: Mar. 29, 2018

(86) PCT No.: PCT/CN2018/081027
§ 371 (c)(1),
(2) Date: Sep. 25, 2020

(87) PCT Pub. No.: WO2019/183871
PCT Pub. Date: Oct. 3, 2019

(65) Prior Publication Data
US 2021/0115243 A1    Apr. 22, 2021

(51) Int. Cl.
| | |
|---|---|
| *C08L 51/06* | (2006.01) |
| *B32B 27/08* | (2006.01) |
| *B32B 27/32* | (2006.01) |
| *B32B 27/36* | (2006.01) |
| *C08K 5/00* | (2006.01) |
| *C08K 5/42* | (2006.01) |
| *C08L 23/06* | (2006.01) |
| *C08L 23/08* | (2006.01) |

(52) U.S. Cl.
CPC .............. *C08L 51/06* (2013.01); *B32B 27/08* (2013.01); *B32B 27/327* (2013.01); *B32B 27/36* (2013.01); *C08K 5/42* (2013.01); *C08L 23/06* (2013.01); *C08L 23/0815* (2013.01); *B32B 2250/03* (2013.01); *B32B 2250/24* (2013.01); *B32B 2270/00* (2013.01); *B32B 2307/406* (2013.01); *B32B 2307/558* (2013.01); *B32B 2307/7244* (2013.01); *B32B 2307/7246* (2013.01); *B32B 2307/732* (2013.01); *B32B 2323/046* (2013.01); *B32B 2367/00* (2013.01); *B32B 2439/00* (2013.01); *C08K 5/0025* (2013.01); *C08L 2205/025* (2013.01); *C08L 2205/03* (2013.01); *C08L 2207/066* (2013.01)

(58) Field of Classification Search
CPC ...... C08L 51/06; C08L 23/06; C08L 23/0815; B32B 2250/03; B32B 2250/24; C08K 5/42; C08K 5/0025
See application file for complete search history.

(56) References Cited

U.S. PATENT DOCUMENTS

| | | | |
|---|---|---|---|
| 4,387,126 A | 6/1983 | Rebholz | |
| 5,643,997 A | 7/1997 | Matsuoka et al. | |
| 6,068,897 A | 5/2000 | Adur et al. | |
| 6,773,735 B1 | 8/2004 | Dalgewicz | |
| 7,037,576 B2 | 5/2006 | Willham et al. | |
| 8,207,265 B2 | 6/2012 | McGee et al. | |
| 8,637,159 B2 | 1/2014 | Botros | |
| 9,499,723 B2 | 11/2016 | Botros | |
| 9,650,548 B2 | 5/2017 | Lee et al. | |
| 2009/0035594 A1 | 2/2009 | Lee et al. | |
| 2009/0035954 A1 | 2/2009 | Yang et al. | |
| 2016/0326335 A1* | 11/2016 | Schmidt | C08G 63/183 |
| 2018/0171186 A1 | 6/2018 | Zheng et al. | |
| 2019/0010367 A1 | 1/2019 | Pucci et al. | |

FOREIGN PATENT DOCUMENTS

| | | | | |
|---|---|---|---|---|
| JP | 2002088328 | | 3/2002 | |
| JP | 2011126270 | | 6/2011 | |
| WO | 2005105437 | A1 | 11/2005 | |
| WO | WO-2016090633 | A1 * | 6/2016 | ............. B32B 27/08 |
| WO | WO-2017039953 | A1 * | 3/2017 | ............. B32B 1/08 |

OTHER PUBLICATIONS

International Search Report & Written Opinion for related PCT Application PCT/CN2018/081027, mailed Dec. 28, 2018 (9 pgs).

* cited by examiner

*Primary Examiner* — Kregg T Brooks
*Assistant Examiner* — David R. Foss
(74) *Attorney, Agent, or Firm* — Jacob R. Graham

(57) ABSTRACT

The disclosure relates to a tie resin formulation for use as a tie layer in a multilayer structure. The resin includes a first polyolefin grafted with an ethylenically unsaturated carboxylic acid, an ethylenically unsaturated acid derivative or a combination thereof, and having a density of 0.857 to 0.885 $g/cm^3$, and 0.001 to 0.20 weight percent (wt. %) of a catalyst comprising at least one Lewis acid, where the resin includes the catalyst and up to 99.999 wt. % of the first polyolefin, where the wt. % is based on a total weight of the resin.

20 Claims, No Drawings

RESINS FOR USE AS TIE LAYER IN MULTILAYER STRUCTURE AND MULTILAYER STRUCTURES COMPRISING THE SAME

This application is a National Stage Application under 35 U.S.C. § 371 of International Application Number PCT/CN2018/081027, filed Mar. 29, 2018 and published as WO 2019/183871 on Oct. 3, 2019, the entire contents of which are incorporated herein by reference in its entirety

TECHNICAL FIELD

The present disclosure relates generally to a resin and more particularly to a resin for use as a tie layer in a multilayer structure.

BACKGROUND

Polyethylene terephthalate (PET) film is widely used in packaging for its aesthetics and physical properties such as its high gloss, its clarity and its barrier and rigidity properties. However, PET film lacks sealing properties due to its relative high melting temperature. Therefore, it is a common practice to form packaging films having PET as a backing film with a laminated sealant layer, such as a polyethylene (PE) sealant film. PET, however, is a material well known for its poor adhesion to other polymers such as PE. So, achieving good adhesion between PET (or its derivatives such as polyethylene terephthalate glycol, PET-g), with a sealant film (e.g., a PE sealant film) in coextrusion and extrusion lamination processes is a challenge in the packaging world.

One approach to improving the adhesion of polymer films to PET has been to use a primer during the coextrusion or extrusion lamination process. Among the issues, however, is drying the primer solution on the PET film can adversely affect the output of the process and adds additional costly manufacturing steps. Additionally, some primers are not environmentally friendly.

Another approach in trying to improve adhesion of polymer films to PET during the coextrusion or extrusion lamination process is to use a resin as a "tie-layer." Examples of resins for use as "tie-layers" include BYNEL®, LOTADER®, AMPLIFY™, ADMER™. Even though a variety of such resins are available as "tie-layers" for use with PET films, few, if any, can achieve the same level of adhesion that is seen in multilayer structures using EVOH or polyamide and PE films. One theory behind this lack of improvement in bonding to PET films is the difficulties associated with the lack of functional groups and polarity and constrained chain mobility caused by the phenyl rings in PET.

As such, there continues to be a need for resins that can help as tie-layers between PET and other polymer films (e.g., PE films) during coextrusion or extrusion lamination.

SUMMARY

The present disclosure relates to a resin formulation with excellent adhesion to polyethylene terephthalate (PET). In some embodiments, this is accomplished without the use of an alkyl acrylate copolymer in the resin. In other words, for the various embodiments, no alkyl acrylate copolymer is used in the resin of the present disclosure. The resin of the present invention shows higher thermal stability than the ethylene acrylate copolymer-based counterparts. Thermal stability of the resin is necessary for high temperature extrusion processes, such as extrusion coating, extrusion lamination and cast processes. The resin of the present disclosure also demonstrates better adhesion than those based on ethylene acrylate copolymers or tackifiers all while showing excellent processability.

The resin for use as a tie layer in a multilayer structure of the present disclosure includes a first polyolefin grafted with an ethylenically unsaturated carboxylic acid, an ethylenically unsaturated acid derivative or a combination thereof, and has a density of 0.857 to 0.885 g/cm$^3$, and 0.001 to 0.20 weight percent (wt. %) of a catalyst comprising at least one Lewis acid, where the resin includes the catalyst and up to 99.999 wt. % of the first polyolefin, where the wt. % is based on a total weight of the resin.

As appreciated by one skilled in the art, the catalyst can be added neat to the first polyolefin in forming the resin, or the catalyst can be added in a "masterbatch" to the first polyolefin in making the resin having the compositions recited herein. The catalyst can be added at a number of different times to provide the resin for use as a tie layer according to embodiments of the present invention. In some embodiments, the catalyst comprising at least one Lewis acid can be added when a polyolefin is grafted with the ethylenically unsaturated carboxylic acid, the ethylenically unsaturated acid derivative or a combination thereof to provide the first polyolefin. As additional examples, the catalyst can be added when a pellet of the first polyolefin is formed and any other components of the resin, or the catalyst can be blended in-line at an extruder with the other components of the resin.

For the various embodiments, the first polyolefin is a polyethylene grafted with maleic anhydride, where the first polyolefin has a grafted maleic anhydride level of 0.01 and 2.4 wt. % maleic anhydride based on the total weight of the polyethylene grafted with maleic anhydride. The polyethylene grafted with maleic anhydride is selected from a group consisting of a linear low-density polyethylene, a low-density polyethylene, an ethylene/alpha-olefin copolymer and combinations thereof. The first polyolefin can have a melt index (I$_2$) value of 8 to 15 g/10 min, where the melt index (I$_2$) is measured in accordance with ASTM D-1238 at 190° C. and at a 2.16 kg load.

The resin of the present disclosure can further include a second polyolefin having a density of 0.855 to 0.930 g/cm$^3$, where the resin includes 50 to 95 wt. % of the second polyolefin based on the total weight of the resin and the total weight of the first polyolefin, the catalyst and the second polyolefin totals 100 wt. %. In an additional embodiment, the resin includes a second polyolefin having a density of 0.855 to 0.930 g/cm$^3$, where the resin includes 60 to 90 wt. % of the second polyolefin based on the total weight of the resin and the total weight of the first polyolefin, the catalyst and the second polyolefin totals 100 wt. %. In an additional embodiment, the resin includes a second polyolefin having a density of 0.855 to 0.930 g/cm$^3$, where the resin includes 65 to 85 wt. % of the second polyolefin based on the total weight of the resin and the total weight of the first polyolefin, the catalyst and the second polyolefin totals 100 wt. %. As noted herein, embodiments of the resin do not include an alkyl acrylate copolymer.

For the various embodiments, the second polyolefin is selected from a group consisting of a linear low-density polyethylene, a low-density polyethylene, a third polyolefin or a combination thereof, where the third polyolefin is different than the first polyolefin. When the second polyolefin is linear low-density polyethylene it can have a density of 0.885 to 0.910 g/cm$^3$. In one embodiment, the second polyolefin can be a combination of the linear low-density polyethylene and a third polyolefin, where the density of the combination of the linear low-density polyethylene and the third polyolefin is 0.855 to 0.930 g/cm³. In an alternative embodiment, the second polyolefin is a combination of the linear low-density polyethylene, the low-density polyethylene and a third polyolefin, where the density of the combined linear low-density polyethylene, the low-density polyethylene and third polyolefin is 0.855 to 0.930 g/cm³. In an additional embodiment, the second polyolefin includes 10 to 90 wt. % of the linear low-density polyethylene, 1 to 20 wt. % of the low-density polyethylene and 1 to 40 wt. % of the third polyolefin, where the wt. % is based on the total weight of the second polyolefin and the total weight of the linear low-density polyethylene, the low-density polyethylene and the third polyolefin totals 100 wt. %.

The catalyst comprises at least one Lewis acid, where the catalyst can be selected from the group consisting of zinc trifluoromethanesulfonate, bismuth trifluoromethanesulfonate, copper trifluoromethanesulfonate, magnesium trifluoromethanesulfonate, nickel trifluoromethanesulfonate, tin trifluoromethanesulfonate or combinations thereof. The resin can include 10 to 200 parts per million by weight of the catalyst based on total weight of the resin.

The present disclosure also includes a multilayer structure comprising at least three layers arranged in order Layer A/Layer B/Layer C, where each of the at least three layers has a first major surface and a second major surface opposite the first major surface. Layer A comprises a polyolefin film, Layer B comprises the resin as described herein, where a first major surface of Layer B is in adhering contact with the second major surface of Layer A, and Layer C comprises ethylene vinyl alcohol, polyamide, polycarbonate, polyethylene terephthalate, polyethylene furanoate, metal foil, or combinations thereof, where the first major surface of Layer C is in adhering contact with the second major surface of Layer B. In one embodiment, the polyolefin film of Layer A is selected from the group consisting of a film of polyethylene, polypropylene or mixtures thereof. In one embodiment, the polyolefin film is a film of polyethylene. In an additional embodiment, the polyolefin film is replaced by a second polyethylene terephthalate film different from Layer C. Other configurations are also possible.

The multilayer structure as provided herein can be used to form a package. In other words, a package is formed with the multilayer structure of the present disclosure. Similarly, a multilayer structure as provided herein can be used to form a laminate. In other words, a laminate is formed with the multilayer structure of the present disclosure. A structural panel formed using the multilayer structure of the present disclosure is also possible.

DETAILED DESCRIPTION

Unless stated to the contrary, implicit from the context, or customary in the art, all parts and percents are based on weight, all temperatures are in degree Celsius (° C.), and all test methods are current as of the filing date of this disclosure.

The term "composition," as used herein, refers to a mixture of materials that comprise the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), the term copolymer and the term interpolymer as defined hereinafter. Trace amounts of impurities (for example, catalyst residues) may be incorporated into and/or within the polymer. A polymer may be a single polymer, a polymer blend or polymer mixture.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The term "polyolefin", as used herein, refers to a polymer that comprises, in polymerized form, a majority amount of olefin monomer, for example ethylene or propylene (based on the weight of the polymer), and optionally may comprise one or more comonomers.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

"Polyethylene" shall mean polymers comprising greater than 50% by weight of units which have been derived from ethylene monomer. This includes polyethylene homopolymers or copolymers (meaning units derived from two or more comonomers). Common forms of polyethylene known in the art include Low-density Polyethylene (LDPE); Linear Low-density Polyethylene (LLDPE); Ultra Low-density Polyethylene (ULDPE); Very Low-density Polyethylene (VLDPE); single-site catalyzed Linear Low-density Polyethylene, including both linear and substantially linear low-density resins (m-LLDPE); Medium Density Polyethylene (MDPE); and High-Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homopolymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm³.

The term "LLDPE", includes both resin made using the traditional Ziegler-Natta catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. Nos. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

The term "ethylene/α-olefin copolymer," as used herein, refers to a copolymer that comprises, in polymerized form, a majority amount (>50 mol %) of units derived from ethylene monomer, and units derived from an α-olefin, as the only two monomer types. The term "α-olefin", as used herein, refers to an alkene having a double bond at the primary or alpha (α) position. In one embodiment, the ethylene/α-olefin copolymer comprises greater than, or equal to, 60 wt. %, further greater than, or equal to, 70 wt. %, further greater than, or equal to, 80 wt. %, further greater than, or equal to, 85 wt. % polymerized ethylene, where the wt. % is based on the weight of the copolymer. Preferred α-olefins include, but are not limited to, $C_3$-$C_{20}$ α-olefins, and preferably $C_3$-$C_{10}$ α-olefins. More preferred α-olefins include propylene, 1-butene, 1-pentene, 1-hexene, 1-heptene and 1-octene, further include propylene, 1-butene, 1-hexene and 1-octene, and further 1-butene, 1-hexene and 1-octene. The ethylene/α-olefin copolymer has a density greater than, or equal to, 0.855 g/cm$^3$, further greater than, or equal to, 0.857 g/cm$^3$, and further greater than, or equal to, 0.860 g/cm$^3$. In one embodiment, the ethylene/α-olefin copolymer has a density less than, or equal to, 0.930 g/cm$^3$, further less than, or equal to, 0.920 g/cm$^3$, and further less than, or equal to, 0.910 g/cm$^3$. In one embodiment, the ethylene/α-olefin copolymer has a density less than, or equal to, 0.900 g/cm$^3$, further less than, or equal to, 0.890 g/cm$^3$, and further less than, or equal to, 0.880 g/cm$^3$. In one embodiment, the ethylene/α-olefin copolymer has a density of 0.857 g/cm$^3$ to 0.900 g/cm$^3$.

The term "multilayer structure" refers to any structure comprising two or more layers having different compositions and includes, without limitation, multilayer films, multilayer sheets, laminated films, multilayer rigid containers, multilayer pipes, and multilayer coated substrates.

Unless otherwise indicated herein, the following analytical methods are used in the describing aspects of the present invention:

"Density" is determined in accordance with ASTM D792, Method B.

"Melt index": Melt indices $I_2$ (or $I_2$) is measured in accordance with ASTM D-1238 at 190° C. and at a 2.16 kg load. The values are reported in g/10 min. "Melt flow rate" is used for polypropylene based resins and determined according to ASTM D1238 (230° C. at 2.16 kg).

Additional properties and test methods are described further herein.

The present disclosure relates to a resin formulation with excellent adhesion to polyethylene terephthalate (PET). In some embodiments, this is accomplished without the use of an alkyl acrylate copolymer in the resin. In other words, for the various embodiments, no alkyl acrylate copolymer is used in the resin of the present disclosure. The resin of the present invention shows higher thermal stability than the ethylene acrylate copolymer-based counterparts. Thermal stability of the resin is significant for high temperature extrusion processes, such as extrusion coating, extrusion lamination and cast processes. The resin of the present disclosure also demonstrates better adhesion than those based on ethylene acrylate copolymers or tackifiers all while showing excellent processability.

Resin for Use as a Tie Layer

The present disclosure provides a resin for use as a tie layer in a multilayer structure that includes a first polyolefin grafted with an ethylenically unsaturated carboxylic acid, an ethylenically unsaturated acid derivative or a combination thereof, and has a density of 0.857 to 0.885 g/cm$^3$, and 0.001 to 0.20 weight percent (wt. %) of a catalyst comprising at least one Lewis acid, where the resin includes the catalyst and up to 99.999 wt. % of the first polyolefin, where the wt. % is based on a total weight of the resin. The present disclosure also provides for embodiments where the resin for use as a tie layer in a multilayer structure includes the first polyolefin grafted with the ethylenically unsaturated carboxylic acid, the ethylenically unsaturated acid derivative or a combination thereof, and has a density of 0.857 to 0.885 g/cm$^3$, and 0.001 to 0.20 wt. % of the catalyst comprising at least one Lewis acid, where the resin includes the catalyst and up to 99.999 wt. % of the first polyolefin, where the wt. % is based on a total weight of the resin and the resin does not include an alkyl acrylate copolymer.

All individual values and subranges for the wt. % of the first polyolefin up to 99.999 wt. % of the resin are included and disclosed herein; for example, the amount of the first polyolefin in the resin can be from a lower limit of 99.800, 99.820, 99.840, 99.860 and 99.880 wt. % to an upper limit of 99.919, 99.939, 99.959, 99.979 and 99.999 wt. %, where the wt. % is based on a total weight of the resin. Similarly, all individual values and subranges from 0.001 to 0.20 wt. % of the catalyst comprising at least one Lewis acid are included and disclosed herein; for example, the amount of the catalyst comprising at least one Lewis acid can be from a lower limit of 0.001, 0.003, 0.005, 0.007, 0.009 and 0.011 wt. % to an upper limit of 0.08, 0.10, 0.12, 0.14, 0.16, 0.18 and 0.20 wt. %, where the wt. % is based on a total weight of the resin.

So, in a preferred embodiment, the resin has a first polyolefin content of 99.800 wt. % to 99.999 wt. % and a catalyst comprising at least one Lewis acid content of 0.001 wt. % to 0.20 wt. %, where the wt. % is based on a total weight of the resin. More preferably, the resin has a first polyolefin content of 99.95 wt. % to 99.999 wt. % and a catalyst comprising at least one Lewis acid content of 0.001 wt. % to 0.05 wt. %, where the wt. % is based on a total weight of the resin. Most preferably, the resin has a first polyolefin content of 99.98 wt. % to 99.997 wt. % and a catalyst comprising at least one Lewis acid content of 0.003 wt. % to 0.02 wt. %, where the wt. % is based on a total weight of the resin. For each of the above resin compositions, the first polyolefin content and the catalyst comprising at least one Lewis acid content can total 100 wt. %.

The first polyolefin grafted with the ethylenically unsaturated carboxylic acid, the ethylenically unsaturated acid derivative or a combination thereof has a density of 0.857 to 0.885 g/cm$^3$. All individual values and subranges from 0.857 to 0.885 g/cm$^3$ are included herein and disclosed herein; for example, the density of the first polyolefin with the ethylenically unsaturated carboxylic acid, the ethylenically unsaturated acid derivative or a combination thereof can be from a lower limit of 0.857, 0.859, 0.861, 0.863, 0.865 or 0.867 g/cm$^3$ to an upper limit of 0.875, 0.877, 0.879, 0.881, 0.883 or 0.885 g/cm$^3$. Preferably, the first polyolefin with the ethylenically unsaturated carboxylic acid, the ethylenically unsaturated acid derivative or a combination thereof has a density of 0.857 to 0.93 g/cm$^3$. Most preferably, the first polyolefin with the ethylenically unsaturated carboxylic acid, the ethylenically unsaturated acid derivative or a combination thereof has a density of 0.865 to 0.91 g/cm$^3$.

In some embodiments, the first polyolefin with the ethylenically unsaturated carboxylic acid, the ethylenically unsaturated acid derivative or a combination has a melt index ($I_2$) of 2 g/10 minutes to 20 g/10 minutes. All individual values and subranges from 5 g/10 minutes to 15 g/10 minutes are included herein and disclosed herein. For example, the first polyolefin with the ethylenically unsaturated carboxylic acid, the ethylenically unsaturated acid derivative or a combination can have a lower limit of the melt index of 0.5, 1, 1.5, 2, 3 or 5 g/10 minutes to an upper limit of 12, 15, 18, 22 or 30 g/10 minutes. In some embodiments, the first polyolefin with the ethylenically unsaturated carboxylic acid, the ethylenically unsaturated acid derivative or a combination can have a melt index of 3 to 30 g/10 minutes, preferably 5 to 15 g/10 minutes. Most preferably, the first polyolefin has a melt index ($I_2$) value of 8 to 15 g/10 min, where the melt index ($I_2$) is measured in accordance with ASTM D-1238 at 190° C. and at a 2.16 kg load.

As discussed herein, the first polyolefin is grafted with an ethylenically unsaturated carboxylic acid, an ethylenically unsaturated acid derivative or a combination thereof using a reactive extrusion process. Techniques for grafting the ethylenically unsaturated carboxylic acid, the ethylenically unsaturated acid derivative or a combination thereof to the first polyolefin are known in the art (e.g., WO 2017/116843 A1 and Moad, G., "The synthesis of polyolefin graft copolymers by reactive extrusion," Prog. Polym. Sci. 24 (1999), 81). The ethylenically unsaturated carboxylic acid and/or the ethylenically unsaturated acid derivative anhydride are selected from the group consisting of maleic anhydride, dibutyl maleate, dicyclohexyl maleate, diisobutyl maleate, dioctadecyl maleate, N-phenylmaleimide, citraconic anhydride, tetrahydrophthalic anhydride, bromomaleic anhydride, chloromaleic anhydride, nadic anhydride, methylnadic anhydride, alkenylsuccinic anhydride, maleic acid, fumaric acid, diethyl fumarate, itaconic acid, citraconic acid, crotonic acid, esters thereof, imides thereof, salts thereof, and Diels-Alder adducts thereof.

Preferably, the first polyolefin is a polyethylene grafted with maleic anhydride, wherein the first polyolefin has a grafted maleic anhydride level of 0.01 and 2.4 wt. % maleic anhydride based on the total weight of the polyethylene grafted with maleic anhydride. For the various embodiments, the polyethylene grafted with maleic anhydride is selected from a group consisting of a linear low-density polyethylene, a low-density polyethylene, an ethylene/alpha-olefin copolymer and a combination thereof. All individual values and subranges from 0.01 and 2.4 wt. % maleic anhydride on the total weight of the maleic anhydride grafted polyethylene are included herein and disclosed herein; for example, the wt. % of maleic anhydride can be from a lower limit of 0.01, 0.05, 0.09, 0.12, 0.15, 0.18, 0.20 or 0.25 wt. % to an upper limit of 1.8, 1.9, 2.0, 2.1, 2.2, 2.3 or 2.4 wt. %. Preferably, the total weight of the maleic anhydride grafted polyethylene is from 0.01 to 2.4 wt. %. More preferably, the total weight of the maleic anhydride grafted polyethylene is from 5 to 95 wt. % of the total weight of the resin for the tie layer. Most preferably, the total weight of the maleic anhydride grafted polyethylene is from 15 to 60 wt. % of the total weight of the resin for the tie layer.

Examples of commercially available polyethylenes and/or maleic anhydride grafted polyethylenes for use in the present disclosure include, but are not limited to, ELITE™, DOWLEX™, ENGAGE™ and AMPLIFY™, each of which are commercially available from The Dow Chemical Company. Other examples include, but are not limited to, BONDYRAM® supplied by Polyram Ram-On Industries, ADMER™ supplied by Mitsui Chemicals Europe GmbH, PLEXAR® supplied by LyondellBasell.

Catalyst

The resins for use as tie layers according to embodiments of the present disclosure include a catalyst having at least one Lewis Acid. For the catalyst, the Lewis Acid can be selected from the group consisting of zinc trifluoromethanesulfonate, bismuth trifluoromethanesulfonate, copper trifluoromethanesulfonate, magnesium trifluoromethanesulfonate, nickel trifluoromethanesulfonate, tin trifluoromethanesulfonate or combinations thereof. The Lewis Acid catalyst can advantageously be included to promote the adhesion of the tie layer to an adjacent PET layer in some embodiments.

The amount of catalyst used in the resin can depend on several factors including the amount of the first polyolefin grafted with the ethylenically unsaturated carboxylic acid, the ethylenically unsaturated acid derivative or combination thereof and the second polyolefin (when present), the catalyst used, the composition of the PET layer and other layers adjacent to the tie layer formed from the resin, and other factors. In some embodiments, the resin comprises 0.001 to 0.20 weight percent of the catalyst comprising at least one Lewis Acid based on the total weight of the resin. The resin, in some embodiments, comprises 0.01 to 0.10 weight percent of the catalyst comprising at least one Lewis Acid based. The resin comprises 0.1 to 0.50 weight percent of the catalyst comprising at least one Lewis Acid based. The resin can include 10 to 200 parts per million by weight of the catalyst based on total weight of the resin.

As appreciated by one skilled in the art, the catalyst can be added neat to the first polyolefin in forming the resin, or the catalyst can be added in a "masterbatch" to the first polyolefin in making the resin having the compositions recited herein. The catalyst can be added at a number of different times to provide the resin for use as a tie layer according to embodiments of the present invention. In some embodiments, the catalyst comprising at least one Lewis acid can be added when a polyolefin is grafted with the ethylenically unsaturated carboxylic acid, the ethylenically unsaturated acid derivative or a combination thereof to provide the first polyolefin. As additional examples, the catalyst can be added when a pellet of the first polyolefin is formed and any other components of the resin, or the catalyst can be blended in-line at an extruder with the other components of the resin.

Second Polyolefin

In some embodiments, the resin for use in a tie layer may further optionally include a second polyolefin having a density of 0.855 to 0.930 g/cm$^3$. For the various embodiments, the resin can include 50 to 95 wt. % of the second polyolefin based on the total weight of the resin, where the total weight of the first polyolefin, the catalyst and the second polyolefin totals 100 wt. %. In an additional embodiment, the resin includes a second polyolefin having a density of 0.855 to 0.930 g/cm$^3$, where the resin includes 60 to 90 wt. % of the second polyolefin based on the total weight of the resin and the total weight of the first polyolefin, the catalyst and the second polyolefin totals 100 wt. %. In an additional embodiment, the resin includes a second polyolefin having a density of 0.855 to 0.930 g/cm$^3$, where the resin includes 65 to 85 wt. % of the second polyolefin based on the total weight of the resin and the total weight of the first polyolefin, the catalyst and the second polyolefin totals 100 wt. %. As noted herein, embodiments of the resin do not include an alkyl acrylate copolymer.

The second polyolefin has a density of 0.855 to 0.930 g/cm$^3$, where all individual values and subranges from 0.855 to 0.930 g/cm$^3$ are included herein and disclosed herein; for example, the density of the second polyolefin can be from a lower limit of 0.855, 0.860, 0.865, 0.870, 0.875 or 0.880 g/cm$^3$ to an upper limit of 0.905, 0.910, 0.915, 0.920, 0.925 or 0.930 g/cm$^3$. Preferably, the second polyolefin has a density of 0.87 to 0.92 g/cm$^3$. Most preferably, the second polyolefin has a density of 0.89 to 0.92 g/cm$^3$.

In some embodiments, the second polyolefin has a melt index ($I_2$) of 0.5 g/10 minutes to 30 g/10 minutes. All individual values and subranges from 0.5 g/10 minutes to 30 g/10 minutes are included herein and disclosed herein. For example, the second polyolefin can have a lower limit of the melt index of 0.5, 1, 2, 3 or 5 g/10 minutes to an upper limit of 7, 9, 11, 12, 15 or 30 g/10 minutes. In some embodiments, the non-polar polyolefin can have a melt index of 1 to 10 g/10 minutes, preferably 2 to 8 g/10 minutes.

For the various embodiments, the second polyolefin is selected from a group consisting of a linear low-density polyethylene, a low-density polyethylene, a third polyolefin or a combination thereof, where the third polyolefin is different than the first polyolefin. Examples of commercially available second polyolefins include DOWLEX™, ELITE™ and AFFINITY™, available from The Dow Chemical Company.

When the second polyolefin is the linear low-density polyethylene it can have a density of 0.885 to 0.910 g/cm$^3$. In one embodiment, the second polyolefin can be the combination of the linear low-density polyethylene and the third polyolefin, where the density of the combination is 0.855 to 0.930 g/cm$^3$. In an alternative embodiment, the second polyolefin is the combination of the linear low-density polyethylene, the low-density polyethylene and the third polyolefin, where the density of the combination is 0.855 to 0.930 g/cm$^3$.

In an additional embodiment, the second polyolefin includes 10 to 90 wt. % of the linear low-density polyethylene, 1 to 20 wt. % of the low-density polyethylene and 1 to 40 wt. % of the third polyolefin, where the wt. % is based on the total weight of the second polyolefin and the total weight of the linear low-density polyethylene, the low-density polyethylene and the third polyolefin totals 100 wt. %.

The resin can be formed by admixing the first polyolefin grafted with the ethylenically unsaturated carboxylic acid, the ethylenically unsaturated acid derivative or a combination thereof with the catalyst comprising at least one Lewis acid, and optionally the second polyolefin (as discussed herein) in a melt state via an extrusion process or batch mixer, as are known in the art. The duration of admixing is such that a homogenous mixture of the first polyolefin grafted with the ethylenically unsaturated carboxylic acid, the ethylenically unsaturated acid derivative or a combination thereof with the catalyst comprising at least one Lewis acid, and, optionally, the second polyolefin is produced, where the admixture is the resin of the present disclosure. Heat can be added to the mixing process, as needed, to allow the first polyolefin grafted with the ethylenically unsaturated carboxylic acid, the ethylenically unsaturated acid derivative or a combination there to mix with the catalyst comprising at least one Lewis acid, and, optionally, the second polyolefin in a melt state. Mixing can take place at atmospheric pressure.

When formed into a tie layer, resins of the present disclosure can provide a number of advantages. For example, in addition to providing adhesion between a PET layer and adjacent polyolefin layers, tie layers formed from some embodiments of the present disclosure can further act as a moisture and/or gas barrier, particularly when positioned adjacent to a conventional barrier layer, such as a barrier layer comprising ethylene vinyl alcohol and/or polyamide. This can advantageously protect against deterioration of gas barrier properties when a multilayer structure is exposed to high moisture or relative humidity in some embodiments. Likewise, the use of such tie layers, in some embodiments, can eliminate the need for other approaches to protect against gas barrier deterioration (e.g., increasing the thickness of LDPE or LLDPE layers in the structure, adding HDPE layer(s) to the structure, including an extra amount of EVOH or polyamide in the barrier layer or structure, etc.).

In embodiments of the present disclosure related to multilayer structures, a tie layer formed from a resin of the present disclosure can be in adhering contact with a PET layer. The PET layer may include one or more ester groups. Examples of commercially available PET that can be used in embodiments of the present disclosure include Polyclear® Crystal™ PET from INVISTA and Laser+®_from DAK Americas.

Additional layers of the multilayer structure can include layers formed from polyamides (nylons), amorphous polyamides (nylons), and/or ethylene vinyl alcohol copolymers (EVOH) and can include scavenger materials and compounds of heavy metals like cobalt with MXD6 nylon. EVOH can include a vinyl alcohol copolymer having 27 to 44 mol % ethylene, and is prepared by, for example, hydrolysis of vinyl acetate copolymers. Examples of commercially available EVOH that can be used in embodiments of the present disclosure include EVAL™ from Kuraray and Noltex™ and Soarnol™ from Nippon Goshei.

In some embodiments, the additional layer can comprise EVOH and an anhydride and/or carboxylic acid functionalized ethylene/alpha-olefin interpolymer, such as those barrier layers disclosed in PCT Publication No. WO 2014/113623, which is hereby incorporated by reference. This inclusion of anhydride and/or carboxylic acid functionalized ethylene/alpha-olefin interpolymer can enhance the flex crack resistance of the EVOH and is believed to provide less points of stress at the interlayer with the tie resin, hence decreasing formation of voids that could negatively impact the gas barrier properties of the overall multilayer structure.

In embodiments where the layer comprises a polyamide, the polyamide can include polyamide 6, polyamide 9, polyamide 10, polyamide 11, polyamide 12, polyamide 6,6, polyamide 6/66 and aromatic polyamide such as polyamide 6I, polyamide 6T, MXD6, or combinations thereof.

In some embodiments, a tie layer formed from a resin of the present disclosure can be in adhering contact with another layer, in addition to a PET layer. For example, in some embodiments, the tie layer can additionally be in adhering contact with a layer comprising polyethylene (i.e., the resin of the tie layer is between the polyethylene layer and the PET layer). In such an embodiment, the polyethylene can be any polyethylene and its derivatives (e.g., ethylene-propylene copolymer) known to those of skill in the art to be suitable for use as a layer in a multilayer structure based on the teachings herein. The polyethylene can be used in such a layer, as well as other layers in the multilayer structure, in some embodiments, can be ultralow-density polyethylene (ULDPE), low-density polyethylene (LDPE), linear low-density polyethylene (LLDPE), medium density polyethylene (MDPE), high density polyethylene (HDPE), high melt strength high density polyethylene (HMS-HDPE), ultrahigh density polyethylene (UHDPE), homogeneously branched ethylene/α-olefin copolymers made with a single site catalyst such as a metallocene catalyst or a constrained geometry catalyst, and combinations thereof.

Hydroxyl groups functionality can also be formed in polyolefin layers via high energy surface activation such as using corona discharge or flame treatment. Thus, tie layers formed from a resin of the present disclosure can be used between a variety of other layers in a multilayer structure as will be evident to those of skill in the art based on the teachings herein.

Some embodiments of multilayer structures can include layers beyond those described above. For example, while not necessarily in adhering contact with a tie layer according to the present invention, a multilayer structure can further comprise other layers typically included in multilayer structures depending on the application including, for example, other barrier layers, sealant layers, other tie layers, other polyethylene layers, polypropylene layers, etc. For example, in some embodiments, a multilayer structure of the present disclosure can include both an inventive tie layer (e.g., a tie layer formed from a resin of the present invention) and a conventional tie layer. As to conventional tie layers, the conventional tie layer can be tie layers known to those of skill in the art to be suitable for use in adhering different layers in a multilayer structure based on the teachings herein.

Additionally, other layers such as printed, high modulus, high gloss layers may be laminated to multilayer structures (e.g., films) of the present disclosure. Further, in some embodiments, the multilayer structure can be extrusion coated to a fiber containing substrate such as paper.

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

Multilayer Structures

Embodiments of the present disclosure also relate to multilayer structures that include a layer formed from a resin of the present invention. In one aspect, a multilayer structure comprises at least three layers arranged in order Layer A/Layer B/Layer C, where each of the at least three layers has a first major surface and a second major surface opposite the first major surface. Layer A comprises a polyolefin film; Layer B comprises the resin provided herein, where a first major surface of Layer B is in adhering contact with the second major surface of Layer A, and Layer C comprises polyethylene terephthalate film, where the first major surface of Layer C is in adhering contact with the second major surface of Layer B.

For Layer A, the polyolefin film can be selected from the group consisting of a film of polyethylene, polypropylene or mixtures thereof. Preferably, the polyolefin film is a film of polyethylene. Layer C can be a film formed from a polymer selected from the group consisting of ethylene vinyl alcohol, polyamide, polycarbonate, polyethylene terephthalate, polyethylene furanoate, metal foil, or combinations thereof, where the first major surface of Layer C is in adhering contact with the second major surface of Layer B. In an additional embodiment, the polyolefin film of Layer A could be replaced by a second polyethylene terephthalate film different from Layer C. Examples include, but are not limited to, Layer A being PEG while Layer C is polyethylene terephthalate glycol, PET-g. Alternatively, Layer A could be PEG-g while Layer C is PET.

It should be understood that in some embodiments the multilayer structure of the present disclosure can include additional layers (e.g., Layer D, Layer E, etc.) such as additional polyethylene layers, which can be formed from the same polyethylene as Layer A, or polyethylene blends, while in other embodiments, such additional layers can be formed from different polyethylenes or polyethylene blends. In other embodiments, the multilayer structure may comprise one or more additional layers adjacent to such polyethylene layers. It should be understood that for the examples above, the first and last layers identified for each example may be the outermost layer in some embodiments, while in other embodiments, one or more additional layers may be adjacent to such layers.

When a multilayer structure comprising the combinations of layers disclosed herein is a multilayer film, the film can have a variety of thicknesses depending, for example, on the number of layers, the intended use of the film, and other factors. In some embodiments, multilayer films of the present disclosure have a thickness of 15 microns to 5 millimeters. Multilayer films of the present invention, in some embodiments, have a thickness of 20 to 500 microns (preferably 50-200 microns). When the multilayer structure is something other than a film (e.g., a rigid container, a pipe, etc.), such structures can have a thickness within the ranges typically used for such types of structures.

Multilayer structures of the present disclosure can exhibit one or more desirable properties. For example, in some embodiments, multilayer structures can exhibit desirable barrier properties, temperature resistance, optical properties, stiffness, sealing, toughness, puncture resistance, and others.

The present disclosure also provides for a package formed with the multilayer structure of the multilayer structure as provided herein. Multilayer structures of the present disclosure can include a combination of two or more embodiments as described herein. Embodiments of the present disclosure also relate to articles comprising any of the multilayer structures (e.g., multilayer films) disclosed herein.

Methods of Preparing Multilayer Structures

When the multilayer structure is a multilayer film or formed from a multilayer film, such multilayer films can be coextruded as blown films or cast films using techniques known to those of skill in the art based on the teachings herein. In an addition embodiment, the layers can be coextruded via a cast film process or multi-layer extrusion coating process. In particular, based on the compositions of the different film layers disclosed herein, blown film manufacturing lines and cast film manufacturing lines can be configured to coextrude multilayer films of the present disclosure in a single extrusion step using techniques known to those of skill in the art based on the teachings herein.

Packages

Multilayer films of the present disclosure can be formed into a variety of packages using techniques known to those of skill in the art. In general, multilayer structures of the present disclosure can be converted into any form of package and deployed under a variety of environmental conditions. Multilayer structures of the present disclosure, in some embodiments, can be particularly useful in converted packages that are subject to, or must undergo high moisture conditions, throughout their service life.

Examples of packages that can be formed from multilayer structures of the present disclosure includes, without limitation, stand-up pouches, bags, extrusion coated paper boards, and others.

Similarly, multilayer structure as provided herein can be used to form a laminate. In other words, a laminate is formed with the multilayer structure of the present disclosure. A structural panel formed using the multilayer structure of the present disclosure is also possible.

Other multilayer structures that can be formed include, for example, multilayer sheets, laminated films, multilayer rigid containers, multilayer pipes, and multilayer coated substrates. Such articles can be formed using techniques known to those of skill in the art based on the teachings herein.

Some embodiments of the disclosure will now be described in detail in the following Examples.

EXAMPLES

Use the following test methods for the Examples.

Melt Index

Measure melt index (MI), $I_2$, in accordance to ASTM D-1238 at 190° C. and at 2.16 kg, where values in g/10 min that correspond to grams eluted per 10 minutes. In case of maleic anhydride grafted polymers, measure the melt index values at the time of sample preparation as some drift in melt index is expected because of hydrolysis.

Density

Prepare samples according to ASTM D4703. Make measurements within one hour of sample preparation according to ASTM D792, Method B.

Percent MAH Grafting

Determine percent maleic anhydride (MAH) grafting in the first polyolefin, as defined herein, using the ratio of peak heights of the MAH ($FTIR_{MAH}$) and the peak heights of the maleic acid ($FTIR_{MA}$) to the peak heights of the polymer reference ($FTIR_{ref}$). Measure the peak heights of MAH at wave number 1791 cm$^{-1}$, the peak heights of maleic acid (MA) at 1721 cm$^{-1}$ and the peak heights of the polyethylene, which are the polymer reference, at 2019 cm$^{-1}$. Multiply the ratio of peak heights by the appropriate calibration constants (A and B) and add the products of the ratios and calibration constants together to equal the MAH wt. %. When polyethylene is the reference polymer, the MAH wt. % is calculated according to the following MAH wt. % formula:

$$MAH \text{ wt \%} = A\left(\frac{FTIR_{MAH} @ 1791 \text{ cm}^{-1}}{FTIR_{ref} @ 2019 \text{ cm}^{-1}}\right) + B\left(\frac{FTIR_{MA} @ 1721 \text{ cm}^{-1}}{FTIR_{ref} @ 2019 \text{ cm}^{-1}}\right)$$

Determine the calibration constant A using $C^{13}$ NMR standards, which are known in the field. The actual calibration constant may differ slightly depending on the instrument and the polymers. The peak heights of maleic acid account for the presence of maleic acid in the polyolefins, which is negligible for freshly grafted polyolefins. However, over time, and in the presence of moisture, maleic anhydride is converted to maleic acid. For MAH grafted polyolefins having a high surface area, significant hydrolysis can occur under ambient conditions in just a few days. The calibration constant B is a correction for the difference in extinction coefficients between the anhydride and acid groups, which can be determined by standards known in the field. The MAH wt. % formula takes different sample thicknesses into account to normalize the data.

Prepare a sample of the MAH grafted polyolefin for FTIR analyst in a heating press. Place a 0.05 mm to about 0.15 mm in thickness sample of the MAH grafted polyolefin between suitable protective films, such as MYLAR™ or TEFLON™, to protect it from the platens of the heating press. Place the sample in the heating press at a temperature of about 150-180° C. press under about 10 tons of pressure for about five minutes. Allow the sample to remain in the heating press for about one hour and then allow to cool to room temperature (23° C.) before scanning in the FTIR.

Run a background scan on the FTIR before scanning each sample, or as needed. Place the sample in an appropriate FTIR sample holder and scan in the FTIR. The FTIR will typically display an electronic graph providing the peak heights of MAH at wave number 1791 cm$^{-1}$, the peak heights of maleic acid at 1721 cm$^{-1}$, and the peak heights of polyethylene at 2019 cm$^{-1}$. The FTIR test should have an inherent variability less than +/−5%.

Adhesion

Conduct adhesion testing in accordance to ASTM F904. Prior to testing, condition samples for a minimum of 40 hrs at 23° C. (±2° C.) and 50% (±10%) relative humidity.

Thermogravimetric Analysis:

Preform thermogravimetric Analysis in air to determine product degradation or thermal stability. Expose the test samples to a 10° C. ramp in air from 100° C. to 900° C. Measure weight loss at 299° C.

Materials:

TABLE 1

| Product (Source) | Type | Density (g/cm³) | Melt Index, 2.16 kg, 190° C., dg/min | Maleic Anhydride Concentration (wt. % based on total product wt.) | Acrylate wt. % |
| --- | --- | --- | --- | --- | --- |
| DOW ™ LDPE 722 (The Dow Chemical Company, TDCC) | Low-density polyethylene | 0.918 | 8 | 0 | 0 |
| DOWLEX ™ 3010 (TDCC) | Linear low-density polyethylene | 0.921 | 5.4 | 0 | 0 |
| AMPLIFY ™ EA 101 (TDCC) | Ethylene ethyl acrylate copolymer | 0.931 | 6 | 0 | 18.5 |
| ELITE ™ 5815 (TDCC) | Enhanced polyethylene | 0.910 | 15 | 0 | 0 |
| ELITE ™ AT 6111 (TDCC) | Enhanced polyethylene | 0.912 | 3.7 | 0 | 0 |
| Product 1 | Ethylene-Octene Copolymer | 0.870 | 10 | 0 | 0 |
| ENGAGE ™ 8200 (TDCC) | Ethylene-Octene Copolymer | 0.870 | 5 | 0 | 0 |
| Product 2* | Maleic anhydride concentrate | 0.931 | 3.23 | greater than 0.5 and less than 2.5 wt. % | 18.5 |
| Product 3** | Maleic anhydride concentrate | 0.870 | 9.4 | greater than 0.5 and less than 2.5 wt. % | 0 |

*Product 2 is maleic anhydride grafted AMPLIFY ™ EA 101 as provided herein.

** Product 3 is maleic anhydride grafted Product 1

Preparation of Product 1

Product 1 is an ethylene-octene copolymer and is prepared using a solution polymerization and a single-site catalyst. In general, the solution polymerization process occurs in one or more well-stirred reactors, such as one or more loop reactors, or one or more isothermal reactors, and at a temperature in the range from 100 to 300° C.; and at pressures in the range of from 2068.4 kPa to 6894.7 kPa (300 to 1,000 psig). Exemplary polymerization processes are disclosed in the following references: U.S. Pat. Nos. 5,272,236; 5,278,272; WO2007/136496 and WO2007/136495.

Preparation of Product 2 and Product 3

Prepare Product 2 and Product 3, as seen in Table 1, through grafting in a reactive extrusion process using a 92 mm co-rotating twin screw extruder, with medium intensity screws. The formulations consist of the base polymer (e.g., AMPLIFY™ EA 101 for Product 2 or Product 1 for Product 3), maleic anhydride (MAH, Huntsman, 99%, CAS No. 108-31-6) and 2,5-dimethyl-2,5-di(t-butylperoxy) hexane (DBPH, CAS No. 78-63-7, peroxide, PDX). Dilute the PDX with mineral oil (1:1) to enhance ease of handling and feeding. The MAH feed level is between 1.4 to 1.5 wt. % and the peroxide level is at 330-650 ppm. Operate the extruder at a rate of 862-953 kg/hr with a screw speed of between 475-630 rpm. The temperature profile (in ° C.) of the extruder for grafting is shown below.

| ZONE 2 | ZONE 3 | ZONE 4 | ZONE 5 | ZONE 6 | ZONE 7 | ZONE 8 | ZONE 9 | ZONE 10 | ZONE 11 | S/C | PDV | DIE |
| --- | --- | --- | --- | --- | --- | --- | --- | --- | --- | --- | --- | --- |
| 177 | 191 | 191 | 191 | 191 | 191 | 177 | 121 | 121 | 121 | 177 | 177 | 177 |

S/C: Screen Changer,

PDV Polymer Divert Valve

Compounding (Preparation of Catalyst Masterbatch & all Resin Compositions)

Prepare a 0.5 wt. % master batch (Catalyst Master Batch) of zinc trifluoromethanesulfonate (Sigma-Aldrich, 98%) by compounding it with ELITE™ 5815G to facilitate feeding. Compound the formulations on a Coperion ZSK-26 mm, co-rotating twin screw extruder. Configure the extruder with 15 barrels (60 L/D). Use a low intensity mixing screw to limit the melt temperature below 220° C. Equip the extruder with a K-Tron loss-in weight feeder for feeding pellets. Inject nitrogen gas in the hopper to maintain an inert atmosphere and minimize oxidation at 0.14-0.28 standard cubic meters per hour. The run rate was kept constant at 6.8-9.1 kg/hr and the screw speed was 300-350 rpm. The temperature profile (all temperatures in degree C.) used was as follows:

| Zone2 | 3 | 4 | 5 | 6 | 7 | 8 | 9 | 10 | 11 | 12 | 13 | 14 | 15 | Die |
|---|---|---|---|---|---|---|---|---|---|---|---|---|---|---|
| 89 | 180 | 180 | 176 | 182 | 180 | 178 | 151 | 150 | 147 | 148 | 148 | 150 | 149 | 180 |

All temperatures in ° C.

Prepare all resin compositions (Example 1-4 and Comparative Examples A-E) for the tie layers using the Coperion ZSK-26 mm, co-rotating twin screw extruder, with the same set-up, twin screw configuration, process conditions and barrel temperatures used for the catalyst masterbatch preparation described above.

Extrusion Lamination Process

Carry out extrusion lamination with resin compositions seen in Table 2 being the tie layer on an extrusion coating line. Use a metalized PET film (mPET, 12 micron thickness) along with a 25.4 micrometer thick film of DOWLEX™ 3010 (TDCC), where the structure of the laminated film is mPET/resin composition tie layer (2.54 micrometer)/DOWLEX™ 3010 (1 mil). Corona treat the unmetalized side of the mPET just prior to extrusion coating with the resin composition of the tie layer. Set the line speed to 134 meters per minute, the chill roll temperature to 18.3° C., and conduct the adhesion tests at 271° C. and 299° C.

TABLE 2

| Resin Compositions | MAH level wt. % | Acrylate (wt. %) |
|---|---|---|
| Example 1:<br>50 wt. % Product 3 + 49 wt. % ELITE™ 5815 +<br>1 wt. % Catalyst Master Bach to provide 50 ppm zinc trifluoromethanesulfonate | 0.49 | 0 |
| Example 2:<br>50 wt. % Product 3 + 49 wt. % ELITE™ AT 6111 +<br>1 wt. % Catalyst Master Bach to provide 50 ppm zinc trifluoromethanesulfonate | 0.39 | 0 |
| Example 3:<br>40 wt. % Product 3 + 39 wt. % ELITE™ AT 6111 +<br>10 wt. % DOW™ LDPE 722 + 1 wt. % Catalyst Master Bach to provide 50 ppm zinc trifluoromethanesulfonate +<br>10% Product 1 | 0.39 | 0 |
| Example 4:<br>30 wt. % Product 3 + 39 wt. % ELITE™ AT 6111 +<br>10% DOW™ LDPE 722 + 1 wt. % Catalyst Master Bach to provide 50 ppm zinc trifluoromethanesulfonate +<br>20 wt. % Product 1 | 0.29 | 0 |
| Comparative Example A<br>Bynel® 21E533 (DuPont, Acrylate) | 0.37 | 20 |
| Comparative Example B<br>50 wt. % Product 2 + 50 wt. % AMPLIFY™ EA 101 | 0.49 | 18.5 |
| Comparative Example C<br>50 wt. % Product 3 + 50% AMPLIFY™ EA 101 | 0.49 | 9.3 |
| Comparative Example D<br>45 wt. % Product 3 + 50 wt. % Engage™ 8200 + 5 wt. %<br>H-130W (hydrocarbon resin tackifier from Eastman Chemical) | 0.44 | 8.3 |
| Comparative Example E<br>45 wt. % Product 3 + 50 wt. % Engage™ 8200 + 5 wt. %<br>Plastolyn 290 (alpha-methyl styrene resin tackifier from Eastman Chemical) | 0.44 | 8.3 |
| Comparative Example F<br>DOW™ LDPE 722 | 0 | 0 |

Adhesion

Prepare multilayer structures having three layers arranged in order Layer A/Layer B/Layer C, where Layer A is PET film; Layer B is the resin composition; Layer C is DOWLEX™ 3010 film. Extrude Layer B using a single screw metering extruder with melt temperature at 271° C. The multilayer structures have three layers of a PET film (12 micron biaxially oriented film and corona treated)/Resin (0.1 mil)/DOWLEX™ 3010 film (1 mil). Produce a control ethylene acrylate tie layer based multilayer structure having the following layer arrangement: PET film/Bynel® 21E533 (0.1 mil)/DOWLEX™ 3010 film (1 mil). The Example and Comparative Examples of the multilayer structure are extrusion coated on the PET film, which has been corona treated before coating, and the DOWLEX™ 3010 film applied to Layer B to form the multilayer structure. The melt temperature for the resin (Layer B) is 271° C.

TABLE 3

Adhesion of Example 1 Resin and Comparative Example
A, C, D and E Resin tie layers to PET at 271° C.

| Resin Composition for Tie Layer (from Table 2) | Adhesion (N/inch) | MAH (wt. %) | Acrylate (wt. %) |
|---|---|---|---|
| Example 1 | 4.6 | 0.49 | 0 |
| Comparative Example A | 3.6 | 0.37 | 20 |
| Comparative Example C | 4.3 | 0.49 | 18.5 |
| Comparative Example D | 2.7 | 0.44 | 8.3 |
| Comparative Example E | 2.2 | 0.44 | 8.3 |

The data demonstrate that the Resin of Example 1 has equivalent or better adhesion to PET than conventional PET tie layer resins that include partially or fully ethylene acrylate copolymers. The data also shows that the incorporation of the selected tackifier (seen in Table 2) does not help with adhesion. It is also noted that the control ethylene acrylate resin degrades significantly when being extruded above 271° C.

Prepare multilayer structures having three layers arranged in order Layer A/Layer B/Layer C, as discussed above, except use the resin composition of Example 2, 3 and 4 and Comparative Examples B, C, F and G for Layer B in each respective multilayer structure. Use a melt temperature for the resin (Layer B) of 299° C.

TABLE 4

Adhesion of Example 2, 3 and 4 Resin and Comparative Example
B, C, F and G Resin Tie Layers to PET at 299° C.

| Resin Composition for Tie Layer (from Table 2) | Adhesion (N/inch) | MAH (wt. %) | Acrylate (wt. %) |
|---|---|---|---|
| Example 2 | 5.1 | 0.39 | 0 |
| Example 3 | 5.3 | 0.39 | 0 |
| Example 4 | 5.0 | 0.29 | 0 |
| Comparative Example B | 3.7 | 0.44 | 8.3 |
| Comparative Example C | 3.9 | 0.44 | 8.3 |
| Comparative Example F | 3.4 | 0 | 0 |
| Comparative Example G | 4.2 | 0.2 | 12.7 |

The data seen in Table 4 demonstrates that the resin compositions of the present disclosure have equivalent or better adhesion to PET than conventional PET tie layer compositions comprising partially or fully ethylene acrylate copolymers. This is surprisingly achieved with their lower MAH content or acrylate content or both than the conventional PET tie layers. Furthermore, the resin compositions of the present disclosure show about a 50% improvement above LDPE (Example F), which is used as a tie layer for PET by some based on oxidation of the LDPE.

Thermal Stability

Measure the thermal stability of the components of the resin by TGA (Thermogravimetric analysis). Preform the thermogravimetric Analysis in air to determine product degradation. Expose the component to a 10° C. ramp in air from 100° C. to 900° C. The weight loss at 299° C. were reported in the following table.

TABLE 5

Degradation of Resin Components at 299° C.

| Weight loss (wt. %) | In Air |
|---|---|
| Product 3 | 1.5 wt. % |
| Product 2 | 2.3 wt. % |
| Bynel ® 21E533 (DuPont) | 2.8 wt. % |
| ELITE ™ AT 6111 | 1.6 wt. % |
| ELITE ™ 5815 | 1.4 wt. % |
| Product 1 | 1.6 wt. % |
| AMPLIFY ™ EA 101 | 2.7 wt. % |

Table 5 demonstrates that components used for the Example resin compositions of the present disclosure, which include Product 3, ELITE™ AT 6111, ELITE™ 5815 and Product 1, are more stable than those with ethylene acrylate used in the Comparative Example resin compositions, which include Product 2, AMPLIFY™ TY EA 101 and Bynel® 21E533. Once degradation exceeding a certain level, the materials starts to lose mechanical properties and functional groups, which are important to generating adhesion to PET.

We claim:

1. A resin for use as a tie layer in a multilayer structure, the resin comprising:
   at least 35 wt. % of a first polyolefin grafted with an ethylenically unsaturated carboxylic acid, an ethylenically unsaturated acid derivative or a combination thereof, and having a density of 0.857 to 0.885 g/cm$^3$; and
   0.001 to 0.20 weight percent (wt. %) of a catalyst comprising at least one Lewis acid, wherein the resin includes the catalyst and up to 99.999 wt. % of the first polyolefin, where the wt. % is based on a total weight of the resin.

2. The resin of claim 1, wherein the first polyolefin is a polyethylene grafted with maleic anhydride, wherein the first polyolefin has a grafted maleic anhydride level of 0.01 to 2.4 wt. % maleic anhydride based on the total weight of the polyethylene grafted with maleic anhydride.

3. The resin of claim 2, wherein the polyethylene grafted with maleic anhydride is selected from a group consisting of a linear low-density polyethylene, a low-density polyethylene, an ethylene/alpha-olefin copolymer and combinations thereof.

4. The resin of claim 1, further comprising a second polyolefin having a density of 0.855 to 0.930 g/cm$^3$, wherein the resin includes 50 to 65 wt. % of the second polyolefin based on the total weight of the resin and the total weight of the first polyolefin, the catalyst and the second polyolefin totals 100 wt. %.

5. The resin of claim 4, wherein the second polyolefin is selected from a group consisting of a linear low-density polyethylene, a low-density polyethylene, a third polyolefin or a combination thereof, wherein the third polyolefin is different than the first polyolefin.

6. The resin of claim 5, wherein the second polyolefin is linear low-density polyethylene having a density of 0.885 to 0.910 g/cm³.

7. The resin of claim 5, wherein the second polyolefin is a combination of linear low-density polyethylene and the third polyolefin, wherein the density of the combined linear low-density polyethylene and third polyolefin is 0.855 to 0.930 g/cm³.

8. The resin of claim 5, wherein the second polyolefin is a combination of linear low-density polyethylene, low-density polyethylene and the third polyolefin, wherein the density of the combination is 0.855 to 0.930 g/cm³.

9. The resin of claim 5, wherein the second polyolefin includes 10 to 90 wt. % of the linear low-density polyethylene, 1 to 20 wt. % of the low-density polyethylene and 1 to 40 wt. % of the third polyolefin, where the wt. % is based on the total weight of the second polyolefin.

10. The resin of claim 1, further comprising a second polyolefin having a density of 0.855 to 0.930 g/cm³, wherein the resin includes 60 to 65 wt. % of the second polyolefin based on the total weight of the resin and the total weight of the first polyolefin, the catalyst and the second polyolefin totals 100 wt. %.

11. The resin of claim 1, wherein the catalyst is selected from the group consisting of zinc trifluoromethanesulfonate, bismuth trifluoromethanesulfonate, copper trifluoromethanesulfonate, magnesium trifluoromethanesulfonate, nickel trifluoromethanesulfonate, tin trifluoromethanesulfonate or combinations thereof.

12. The resin of claim 1, wherein the resin includes 10 to 200 parts per million by weight of the catalyst based on total weight of the resin.

13. The resin of claim 1, wherein the first polyolefin has a melt index ($I_2$) value of 8 to 15 g/10 min, where the melt index ($I_2$) is measured in accordance with ASTM D-1238 at 190° C. and at a 2.16 kg load.

14. The resin of claim 1, wherein the resin does not include an alkyl acrylate copolymer.

15. A multilayer structure comprising at least three layers arranged in order Layer A/Layer B/Layer C, wherein each of the at least three layers has a first major surface and a second major surface opposite the first major surface, wherein:
Layer A comprises a polyolefin film;
Layer B comprises the resin of claim 1, wherein a first major surface of Layer B is in adhering contact with the second major surface of Layer A; and
Layer C comprises ethylene vinyl alcohol, polyamide, polycarbonate, polyethylene terephthalate, polyethylene furanoate, metal foil, or combinations thereof, wherein the first major surface of Layer C is in adhering contact with the second major surface of Layer B.

16. The multilayer structure of claim 15, wherein the polyolefin film of Layer A is selected from the group consisting of a film of polyethylene, polypropylene or mixtures thereof.

17. The multilayer structure of claim 15, wherein the polyolefin film of Layer A is a film of polyethylene.

18. The multilayer structure of claim 15, wherein the polyolefin film is replaced by a second polyethylene terephthalate film different from Layer C.

19. A package formed with the multilayer structure of claim 1.

20. The resin of claim 1, wherein the first polyolefin is grafted in a reactive extrusion process with a maximum temperature under 200 ° C.

* * * * *